United States Patent
Compton et al.

(10) Patent No.: US 8,384,813 B2
(45) Date of Patent: *Feb. 26, 2013

(54) SUSPENDING COLUMN ADDRESSING IN IMAGE SENSORS

(75) Inventors: John T. Compton, LeRoy, NY (US); Jeffrey S. Gerstenberger, Rochester, NY (US); Ravi Mruthyunjaya, Penfield, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 12/972,947

(22) Filed: Dec. 20, 2010

(65) Prior Publication Data

US 2012/0154655 A1    Jun. 21, 2012

(51) Int. Cl.
*H04N 5/335* (2011.01)
*H04N 3/14* (2006.01)

(52) U.S. Cl. ........................................ 348/308; 348/321

(58) Field of Classification Search ................. 348/321, 348/323, 308, 392, 241–251, 294–307
See application file for complete search history.

(56) References Cited

U.S. PATENT DOCUMENTS

| | | | |
|---|---|---|---|
| 7,999,870 B2 | 8/2011 | Compton et al. | |
| 2005/0168602 A1* | 8/2005 | Sumi et al. | 348/294 |
| 2006/0192087 A1 | 8/2006 | Kuszpet et al. | |
| 2008/0012971 A1 | 1/2008 | Myers et al. | |
| 2008/0246867 A1 | 10/2008 | Sugai et al. | |
| 2008/0259214 A1 | 10/2008 | Tsumura et al. | |
| 2008/0284887 A1* | 11/2008 | Toya et al. | 348/302 |
| 2009/0096890 A1* | 4/2009 | Li | 348/294 |
| 2009/0195681 A1 | 8/2009 | Compton et al. | |
| 2011/0157444 A1 | 6/2011 | Gerstenberger et al. | |
| 2011/0169992 A1* | 7/2011 | Endo et al. | 348/308 |

FOREIGN PATENT DOCUMENTS

| | | |
|---|---|---|
| EP | 1313061 A2 | 5/2003 |
| EP | 1 313 061 | 3/2006 |

OTHER PUBLICATIONS

PCT/US2010/060440; International Search Report and Written Opinion of the International Searching Authority, mail date Mar. 3, 2011 (7 pages).

* cited by examiner

*Primary Examiner* — Aung S Moe
(74) *Attorney, Agent, or Firm* — Blakely Sokoloff Taylor & Zafman LLP

(57) ABSTRACT

An image sensor includes a two-dimensional array of pixels having multiple column outputs and an output circuit connected to each column output. Each output circuit is configured to operate concurrent sample and read operations. A timing generator outputs a column address sequence that is received by a column decoder that is electrically connected to each output circuit. The timing generator suspends the output of the column address sequence during a sample operation and resumes the output of the column address sequence at the end of the sample operation.

7 Claims, 7 Drawing Sheets

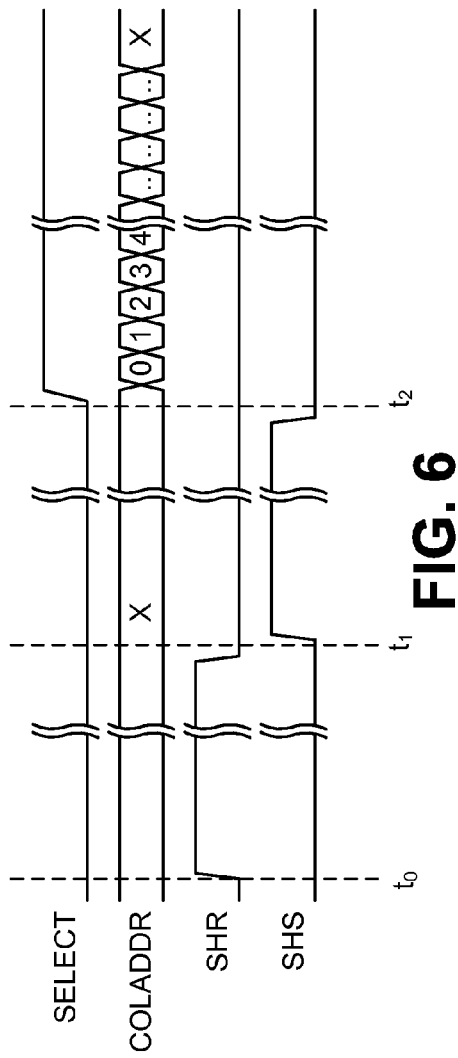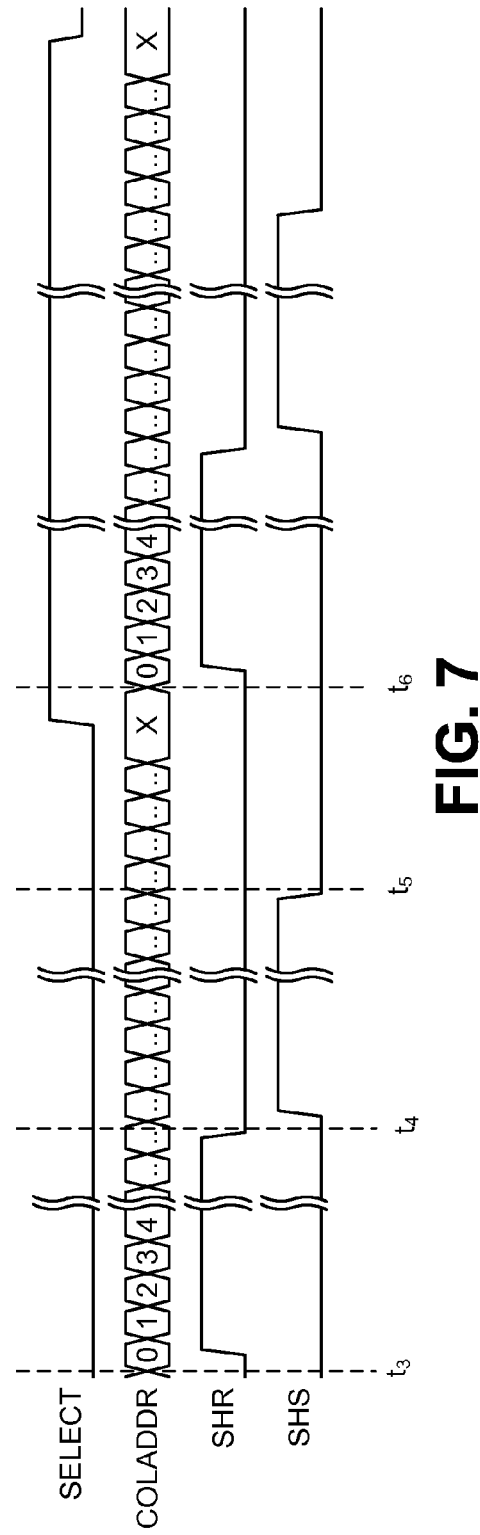

SUSPENDING COLUMN ADDRESSING IN IMAGE SENSORS

CROSS REFERENCE TO RELATED APPLICATIONS

This application is related to U.S. patent application Ser. No. 12/952,466, filed on Nov. 23, 2010.

TECHNICAL FIELD

The present invention relates generally to electronic image sensors for use in digital cameras and other image capture devices, and more particularly to sampling and readout techniques for use with an electronic image sensor.

BACKGROUND

A typical solid-state electronic image sensor comprises a number of light-sensitive picture elements ("pixels") arranged in a two-dimensional array. These pixels are generally formed in a semiconductor material and have the property of accumulating electric charges resulting from electron-hole pairs created by the photons entering the pixels. In a charge-coupled device (CCD) image sensor, the accumulated charges may be read out of the image sensor by shifting the charge out of the array. Alternatively, in an active pixel sensor (APS), the charge may be converted to a voltage by circuitry located within the array in proximity to the pixel and the resulting voltages may be sampled and read in a scanning fashion. APS image sensors are also known as Complementary Metal Oxide Semiconductor (CMOS) image sensors.

In accordance with conventional practice, sampling and readout of the pixel signals in a CMOS image sensor generally involves sampling all the pixel signals in a given row into column circuits, and then reading out the entire row of sampled pixel signals in a sequential fashion from the column circuits. This sampling and readout operation proceeds row by row until the entire pixel array is read out. In conventional practice, the sampling and readout operations do not overlap in time, and the sampling operation represents a significant fraction of the total time required to read the pixel signals from the array.

U.S. Patent Application Publication No. 2009/0195681, entitled "Sampling and Readout of an Image Sensor Having a Sparse Color Filter Array Pattern," which is incorporated by reference herein, discloses sampling and readout for a CMOS image sensor where sampling of pixel signals occurs concurrently with readout of previously sampled pixels. In this scheme, two column circuits are provided for each column signal output from the pixel array. A pixel signal from a selected pixel is sampled by one of the column circuits at the same time that a previously sampled pixel signal in the other column circuit is being read out. By overlapping the sampling and readout operations in this way, the amount of time used for the sampling operation is eliminated. This reduces the total time required to read the pixel signals from the array and increases the frame readout rate of the image sensor.

The sampling operation may sample system noise in addition to pixel signals. Since the sampling operation described above occurs simultaneously for an entire row of pixel signals, there is the potential for captured system noise to be correlated for an entire row or a portion of a row of sampled pixel signals. In an imaging system as described above, this row correlated noise produces an objectionable visual artifact in the captured image. In conventional non-overlapping sampling and readout of a CMOS image sensor, the system noise may be reduced by shutting off noise generators during the sampling time, notably clock signals to portions of the readout circuitry. However, in the overlapping sampling and readout operation outlined above, turning off the clock signals to the readout circuitry during sampling is not an option as the readout operation takes place concurrently with the sampling operation. Consequently, although the concurrent sampling and readout technique provides an improvement in readout time, it also increases susceptibility to sampling system noise and incurring objectionable row-correlated visual artifacts.

SUMMARY

Briefly summarized, according to one aspect of the present invention, the invention provides an image sensor that includes a two-dimensional array of pixels having multiple column outputs and an output circuit connected to each column output. Each output circuit is configured to operate concurrent sample and read operations. A timing generator outputs a column address sequence that is received by a column decoder that is electrically connected to each output circuit. The timing generator suspends the column address sequence during a sample operation and resumes the column address sequence at the end of the sample operation.

Another aspect of the present invention provides a method for reading out an image from an image sensor. The image sensor includes a two-dimensional array of pixels having a plurality of column outputs and an output circuit connected to each column output, where each output circuit is configured to operate concurrent sample and read operations. The method begins by initiating concurrent sample and read operations in each output circuit. During a first sample operation, such as a sample operation for pixel RESET signals, a column address sequence is suspended. When the first sample operation is complete, the column address sequence resumes. During a second sample operation, such as a sample operation for pixel SIGNAL signals, the column address sequence is suspended again. When the second sample operation is complete, the column address sequence resumes. Suspension of the column address sequence can repeat until all of the signals have been sampled and readout of the pixel array.

In both aspects of the present invention, pixel data output from each output circuit can be stored while the column address sequence is suspended. Storing of the pixel data selectively delays the output of the pixel data to effect an uninterrupted output data flow of pixel data.

ADVANTAGEOUS EFFECT

Image sensors and image capture methods in accordance with the present invention are useful for reducing the time required to capture images while reducing noise in the captured images. These image sensors and methods have a broad application and numerous types of image capture devices can effectively use these sensors and methods.

BRIEF DESCRIPTION OF THE DRAWINGS

Embodiments of the invention are better understood with reference to the following drawings. The elements of the drawings are not necessarily to scale relative to each other.

FIG. 6 depicts an exemplary timing diagram for non-concurrent sample and read operations for sampling and readout output circuits 210 shown in FIG. 2;

FIG. 7 depicts an exemplary timing diagram for concurrent sample and read operations for column output circuits 210 shown in FIG. 2;

DETAILED DESCRIPTION

Figure 1:
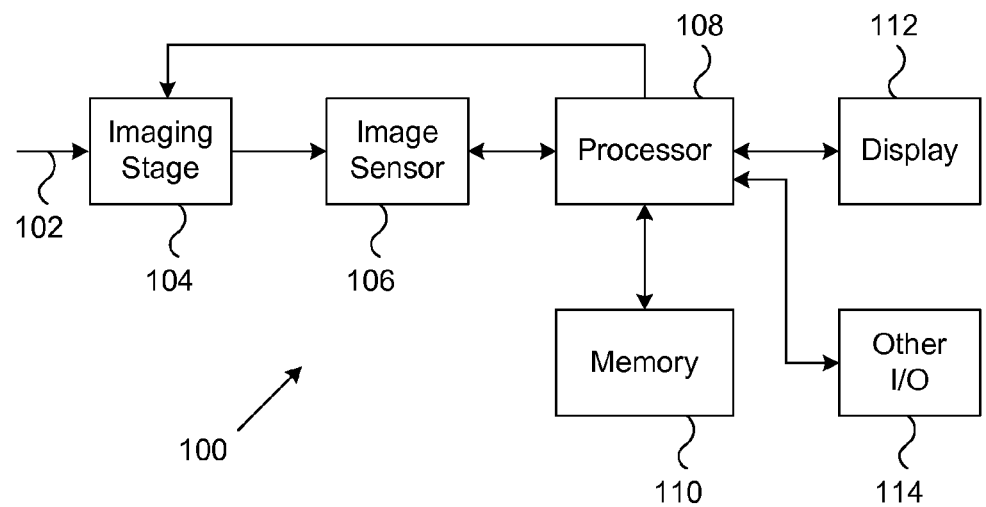
FIG. 1 is a simplified block diagram of an image capture device in an embodiment in accordance with the invention.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected, or an indirect connection through one or more passive or active intermediary devices. The term "circuit" means either a single component or a multiplicity of components, either active or passive, that are connected together to provide a desired function. The term "signal" means at least one current, voltage, or data signal.

Additionally, directional terms such as "on", "over", "top", "bottom", are used with reference to the orientation of the Figure(s) being described. Because components of embodiments of the present invention can be positioned in a number of different orientations, the directional terminology is used for purposes of illustration only and is in no way limiting.

Referring to the drawings, like numbers indicate like parts throughout the views.

FIG. 1 is a simplified block diagram of an image capture device in an embodiment in accordance with the invention. Image capture device 100 is implemented as a digital camera in FIG. 1. Those skilled in the art will recognize that a digital camera is only one example of an image capture device that can utilize an image sensor incorporating the present invention. Other types of image capture devices, such as, for example, cell phone cameras, scanners, and digital video camcorders, can be used with the present invention.

In digital camera 100, light 102 from a subject scene is input to an imaging stage 104. Imaging stage 104 can include conventional elements such as a lens, a neutral density filter, an iris and a shutter. Light 102 is focused by imaging stage 104 to form an image on image sensor 106. Image sensor 106 captures one or more images by converting the incident light into electrical signals. Digital camera 100 further includes processor 108, memory 110, display 112, and one or more additional input/output (I/O) elements 114. Although shown as separate elements in the embodiment of FIG. 1, imaging stage 104 may be integrated with image sensor 106, and possibly one or more additional elements of digital camera 100, to form a camera module. For example, a processor or a memory may be integrated with image sensor 106 in a camera module in embodiments in accordance with the invention.

Processor 108 may be implemented, for example, as a microprocessor, a central processing unit (CPU), an application-specific integrated circuit (ASIC), a digital signal processor (DSP), or other processing device, or combinations of multiple such devices. Various elements of imaging stage 104 and image sensor 106 may be controlled by timing signals or other signals supplied from processor 108.

Memory 110 may be configured as any type of memory, such as, for example, random access memory (RAM), read-only memory (ROM), Flash memory, disk-based memory, removable memory, or other types of storage elements, in any combination. A given image captured by image sensor 106 may be stored by processor 108 in memory 110 and presented on display 112. Display 112 is typically an active matrix color liquid crystal display (LCD), although other types of displays may be used. The additional I/O elements 114 may include, for example, various on-screen controls, buttons or other user interfaces, network interfaces, or memory card interfaces.

It is to be appreciated that the digital camera shown in FIG. 1 may comprise additional or alternative elements of a type known to those skilled in the art. Elements not specifically shown or described herein may be selected from those known in the art. As noted previously, the present invention may be implemented in a wide variety of image capture devices. Also, certain aspects of the embodiments described herein may be implemented at least in part in the form of software executed by one or more processing elements of an image capture device. Such software can be implemented in a straightforward manner given the teachings provided herein, as will be appreciated by those skilled in the art.

Figure 2:
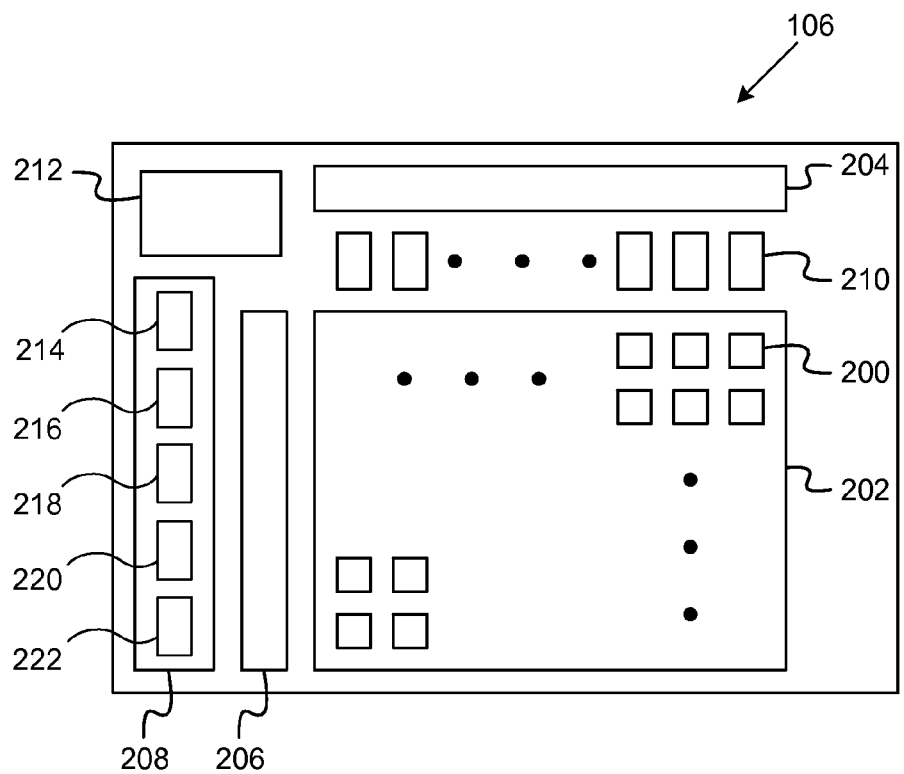
FIG. 2 is a block diagram of a top view of a CMOS image sensor in an embodiment in accordance with the invention.

Referring now to FIG. 2, there is shown a block diagram of a top view of image sensor 106 in an embodiment in accordance with the invention. Image sensor 106 includes a number of pixels 200 that are typically arranged in rows and columns to form a pixel array 202. Image sensor 106 further includes column decoder 204, row decoder 206, digital logic 208, multiple sampling and readout output circuits 210, and analog front end (AFE) circuit 212. Row decoder 206 provides control signals to the rows of pixels 200 in pixel array 202. Some of these control signals are used to read out the signals from individual rows of pixels. Other control signals are used to reset individual rows of pixels to a known potential.

Digital logic 208 includes control register 214, timing generator 216, analog front end (AFE) clock controller 218, analog front end (AFE) interface 220, and digital buffer 222. In an embodiment in accordance with the invention, control register 214 stores the number of clock periods that occur prior to pausing the column addressing signals. The column addressing signals are preferably paused near the end of the sampling operation. If the addressing signals are paused too close to the end of the sampling period, there can still be noise from the clocking/addressing that will show as image artifacts. If the addressing signals are paused too soon, then performance will be degraded. The timing of when the addressing signals are paused is determined by the minimum length of the pause that effectively reduces or eliminates noise.

Timing generator 216 produces the timing and control signals needed to operate image sensor 106, including address signals to column decoder 204 and row decoder 206 that control the output of the column and row addressing signals. AFE clock controller 218 enables and disables (i.e., suspends) the AFE clock signal input to AFE circuit 212. The AFE clock controller receives an ENABLE signal from the timing generator, and when enabled it produces the AFE clock signal. The timing generator counts clock pulses and produces the ENABLE signal (used by the AFE clock controller) to suspend the AFE clock signal in an embodiment in accordance with the invention. AFE interface 220 receives data output from AFE circuit 212 and digital buffer 222 stores the data output from AFE circuit 212 to produce a non-interrupted flow of data output from the image sensor.

Each column of pixels in pixel array 202 is electrically connected to a sampling and readout output circuit 210. Sampling and readout output circuits 210 sample and hold the analog signals output from the columns of pixels. Column decoder 204 sequentially addresses sampling and readout output circuits 210 to read out the sampled analog signals. Each analog signal output from the sampling and readout output circuits 210 is amplified, conditioned, and converted to a digital signal by AFE circuit 212.

Column decoder 204 and row decoder 206 have several alternative implementations that are well known to those skilled in the art. For example, column decoder 204 may be a one-of-many decoder that accepts a digital column address in binary code, Gray code, or some other code and provides an output that selects a specific sampling and readout output circuit based on the column address. Alternatively, column decoder 204 may be a shift register that selects the sampling and readout output circuits in sequence. Similar options are available for row decoder 206.

Furthermore, the sequence of reading the sampled pixel signals from the sampling and readout output circuits is not required to follow a strict order or numerical sequence, but can include skipping one or more sampling and readout output circuits, reading different blocks of sampling and readout output circuits in different sequence orders, and reading sampling and readout output circuits in a pseudo-random sequence. Similar options apply to the row control signals provided by row decoder 206. All these options and others known to skilled practitioners are within the scope of this invention, and the terms column decoder and row decoder do not limit any methods and apply broadly to all methods for selecting columns and rows, respectively. Additionally, all sequences of selecting sampling and readout output circuits for reading and all sequences of controlling row-based operations are within the scope of this invention.

Image sensor 106 is implemented as an x-y addressable image sensor formed on a single monolithic semiconductor die in an embodiment in accordance with the invention. In another embodiment in accordance with the invention, image sensor 106 is implemented as an x-y addressable image sensor with the components or circuitry formed on two or more stacked semiconductor die. A CMOS image sensor is one example of an x-y addressable image sensor.

Portions of the functional blocks of image sensor 106 may be implemented external to image sensor 106 in other embodiments in accordance with the invention. By way of example only, timing generator 216 may be implemented in a field programmable gate array (FPGA). Alternatively, digital logic 208 and AFE circuit 212 may be included in a separate integrated circuit.

Functionality associated with the sampling and readout of pixel array 202 and the processing of corresponding image data may be implemented at least in part in the form of software that is stored in memory 110 (see FIG. 1) and executed by processor 108. Portions of the sampling and readout circuitry may be arranged external to image sensor 106, or formed integrally with pixel array 200, for example, on a common integrated circuit with photodetectors and other elements of the pixel array. Those skilled in the art will recognize that other peripheral circuitry configurations or architectures can be implemented in other embodiments in accordance with the invention.

Figure 3:
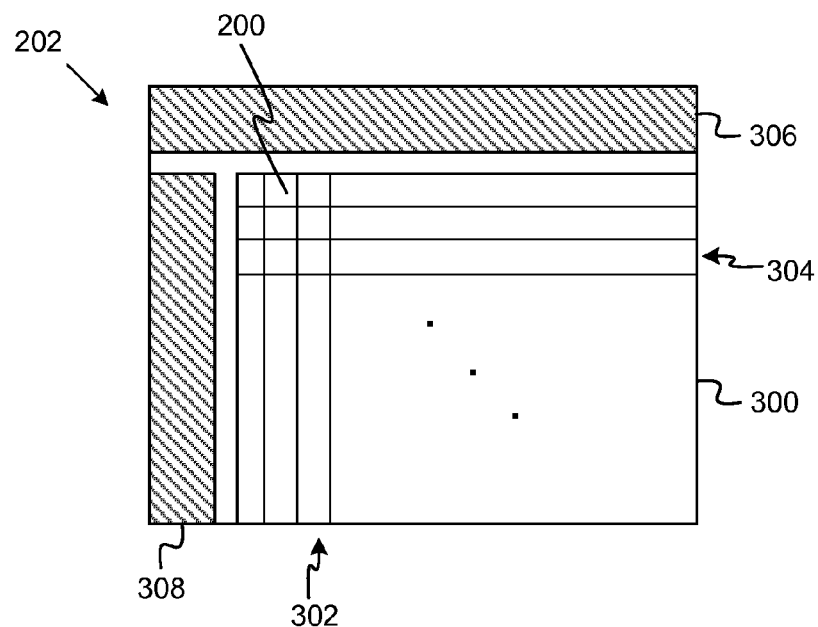
FIG. 3 is a more detailed diagram of pixel array 202 shown in FIG. 2.

FIG. 3 is a more detailed diagram of pixel array 202 shown in FIG. 2. Pixel array 200 includes an active area 300 having columns 302 and rows 304 of photoactive pixels 200. Photoactive pixels 200 each include one or more photodetectors (not shown) that collect and store photo-generated charge carriers in response to incident light. Photoactive pixels 200 are used to capture an image of a scene.

Reference area 306 includes rows of dark reference pixels while reference area 308 includes columns of dark reference pixels. Dark reference pixels are typically covered by an opaque layer or light shield to prevent light from striking the pixels. The dark reference pixels are used to measure the amount of charge produced in image sensor 106 without light. Dark reference pixels may be constructed with or without photodetectors in embodiments in accordance with the invention.

The signals read out of the rows of dark reference pixels in reference area 306 are averaged together to provide a column-by-column dark offset reference in an embodiment in accordance with the invention. The dark offset reference is used to correct for column fixed pattern offset (column fixed pattern noise). The signals read out of the columns of dark reference pixels in area 306 are averaged together to provide a row-by-row dark offset reference in an embodiment in accordance with the invention. The dark offset reference is used to correct for row temporal offset (row temporal noise).

Those skilled in the art will recognize pixel array 202 can have millions to tens of millions of pixels that can be arranged in any configuration. By way of example only, rows of dark reference pixels can be situated at the top and bottom of pixel array 202. Alternatively, the photoactive pixels can be confined in a sub-array with rows and columns of dark reference pixels surrounding each edge of the sub-array. Another alternative disperses the dark reference pixels within pixel array 202 such that dark reference pixels are intermingled with photoactive pixels.

Figure 4:
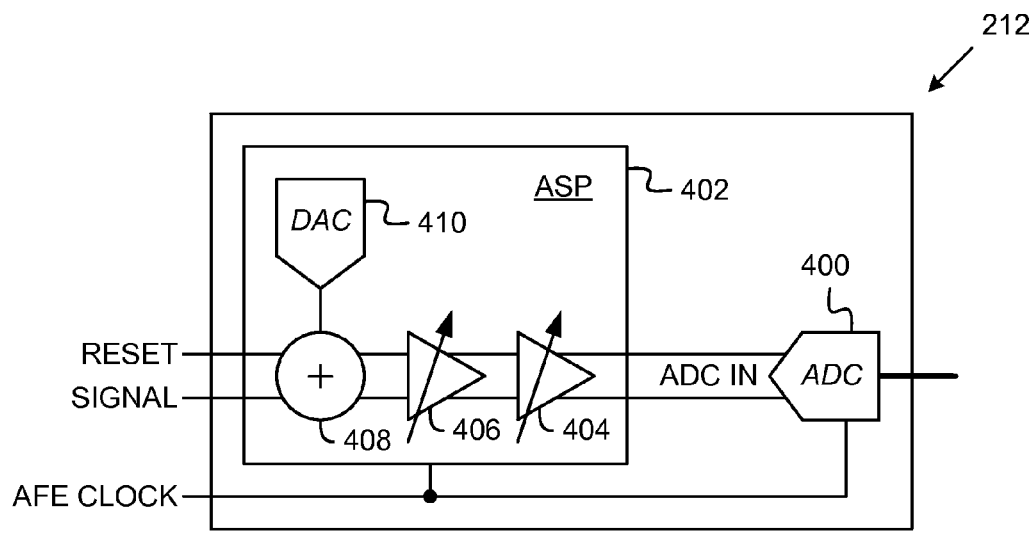
FIG. 4 is a block diagram of AFE circuit 212 shown in FIG. 2.

Referring now to FIG. 4, there is shown a block diagram of AFE circuit 212 shown in FIG. 2. AFE circuit 212 receives a differential pair of analog signals from each pixel in an embodiment in accordance with the invention. One analog signal is identified as RESET and the other signal as SIGNAL. AFE circuit 212 amplifies and conditions the RESET and SIGNAL analog signals, and converts the analog signals to digital signals.

AFE circuit 212 includes one or more signal processing blocks. In the illustrated embodiment, AFE circuit 212 includes analog to digital converter (ADC) 400 and analog signal processor (ASP) 402. In an embodiment in accordance with the invention, ASP 402 includes two cascaded variable gain amplifiers 404, 406 connected in series, a signal summing node 408 connected to an input of the first variable gain amplifier in the series (e.g., amplifier 406), and a digital to analog converter (DAC) 410 connected to the signal summing node. RESET and SIGNAL signals are input into signal summing node 408 and the output of the second variable gain amplifiers (e.g., amplifier 404) is input into ADC 400. Other embodiments in accordance with the invention include one or more variable gain amplifiers. DAC 410 and signal summing node 408 are used for analog dark offset correction. A clock signal, AFE CLOCK, is provided to the ADC 400 and the ASP 402. This clock signal synchronizes the sampling and conversion operations of the ADC 400 and ASP 402 with the sequential output of the sampling and readout output circuits 210. Although typical design of the elements of ASP 402 includes switched capacitor or other design approaches that require the use of a clocking signal such as AFE CLOCK, alternative non-switching design approaches that do not require AFE CLOCK may be used for the elements of ASP 402.

Figure 5:
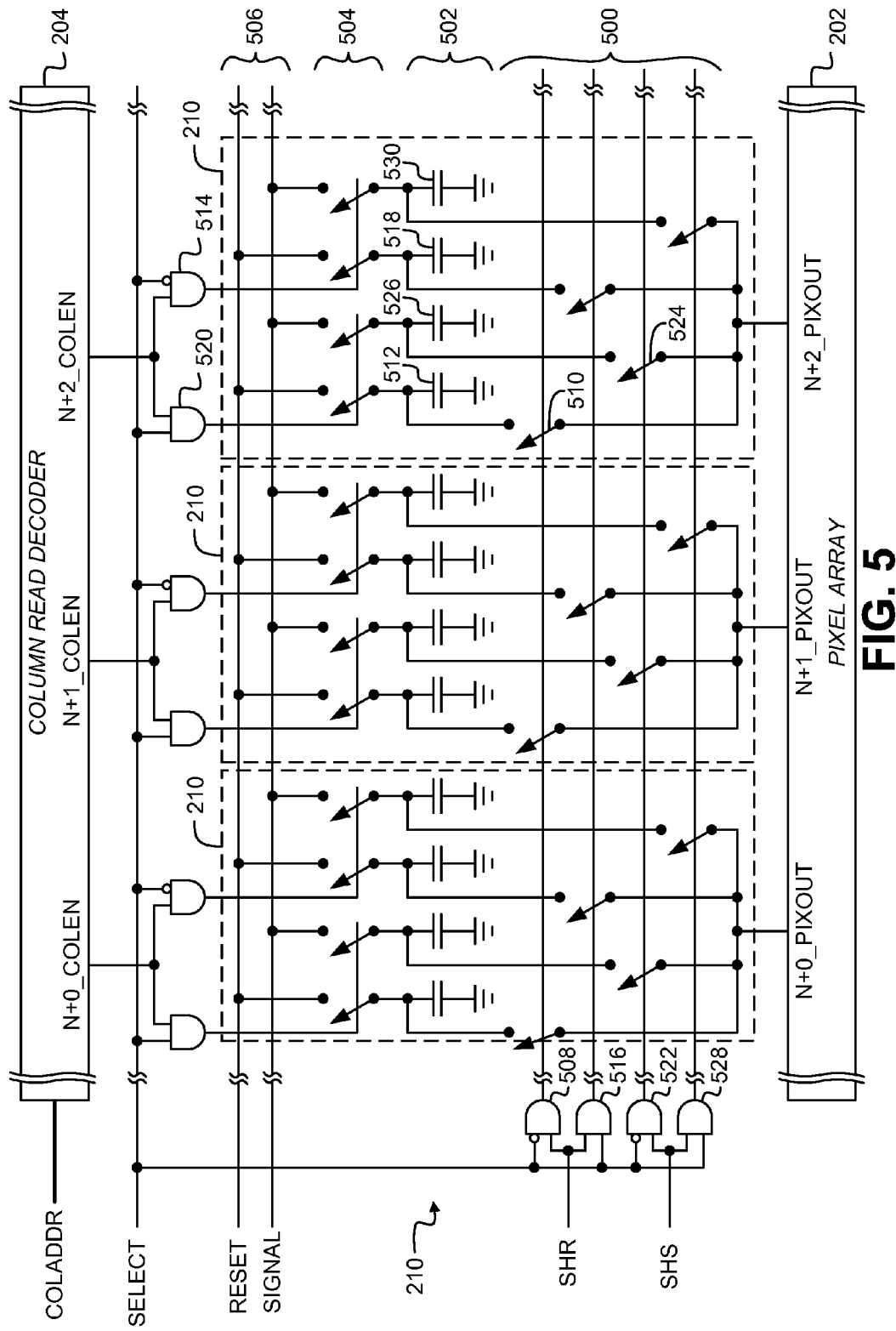
FIG. 5 is a circuit diagram of a portion of sampling and readout output circuitry 210 shown in FIG. 2.

FIG. 5 is a circuit diagram of a portion of sampling and readout output circuitry 210 shown in FIG. 2. Sampling and readout output circuitry 210 includes including sampling switches 500, sample and hold capacitors 502, readout (or column enable) switches 504, and differential analog output bus 506. Differential analog output bus 506 connects to AFE circuit 212 shown in FIG. 2.

FIG. 5 depicts an exemplary arrangement of output circuits that permits a row of pixels to be sampled concurrently with the read out of a previously sampled row of pixels. This is known as a concurrent sample and read operation. Each column output in pixel array 202 (N+0_PIXOUT, N+1_PIXOUT, . . . ) is connected to the inputs of four sampling switches 500 in a respective output circuit 210. An output of each sampling switch 500 is connected to a sample and hold capacitor 502. Each sample and hold capacitor 502 is connected to an input of a readout switch 504. The outputs of readout switches 504 are connected to output bus 506.

In the illustrated embodiment, output bus 506 includes two signal lines, one for the RESET signal and one for the SIGNAL signal. The outputs of two readout switches in each group of four readout switches are connected to the RESET signal line in output bus 506. The outputs of the other two readout switches in each group of four readout switches are connected to the SIGNAL signal line in output bus 506.

Each column output is selectively connected to one of the four sample and hold capacitors 502 in a respective output circuit 210 via respective sampling switches 500. Two sample and hold capacitors 502 in each output circuit 210 are provided to sample and hold a reset signal from a pixel while the other two sample and hold capacitors 502 sample and hold an image signal from the pixel. The sampling switches 500 connected to the two sample and hold capacitors 502 for the reset signal are controlled by the Sample and Hold Reset (SHR) signal. The sampling switches 500 connected to the two sample and hold capacitors 502 for the image signal are controlled by Sample and Hold Signal (SHS).

Although the internal details of pixel array 202 are not shown in FIG. 5, those skilled in the art will recognize that individual pixel readout circuits in the array may be shared by two or more pixels. For example, a physical row of pixels in pixel array 202 may comprise pairs of pixels with each pair sharing a common output signal. In this case, each of the signals provided on the outputs (N+0_PIXOUT, N+1_PIXOUT, . . . ) will represent the output of only one of each pair of pixels, or possibly the combined outputs of both pixels in each pair. Consequently, in order to read out each individual pixel in a physical row, two sampling and readout operations are used; one sampling and readout operation for each of the two pixels in the pairs constituting the rows. Therefore, the reference to sampling or reading a row of pixels is to be understood to include full physical rows of pixels, alternate pixels from a physical row, combined pairs of pixels from a physical row, or other alternatives depending on the details of pixel structures and readout circuit sharing arrangements within the pixel array.

The signals held in sample and hold capacitors 502 are read out by sequentially connecting the sample and hold capacitors 502 to output bus 506 by means of the readout switches 504. Each output in column decoder 204 is electrically connected to respective readout switches 504 in each group of four readout switches via logic gates (e.g., AND gates 514, 520). Column decoder 204 decodes the column address COLADDR in order to selectively enable two readout switches 504 in each group of four readout switches and select one differential pair of sample and hold capacitors 502 for readout.

The SELECT signal determines which sample and hold capacitors 502 are available for sampling and which sample and hold capacitors 502 are available for readout. For example, when SELECT is low, AND gate 508 permits the SHR signal to operate the leftmost sampling switch (e.g., switch 510) in each group of four sampling switches 500 to allow a reset signal to be stored in the leftmost sample and hold capacitor (e.g., capacitor 512). AND gate 514 permits the N+x_COLEN signals (i.e., N+0_COLEN, N+1_COLEN, . . . ) to select the right pair of each group of four sampling capacitors 502 for readout.

When SELECT is high, AND gate 516 permits sampling into the third from the left of each group of four sample and hold capacitors 502 (e.g., capacitor 518), while AND gate 520 permits the N+x_COLEN signals to select the left pair of each group of four sample and hold capacitors 502. The AND gates ensure that sampling and readout operations are mutually exclusive with regard to the use of the sampling capacitors 502.

The SHS signal operates similarly to the SHR signal. For example, when SELECT is low, AND gate 522 permits the SHS signal to operate the sampling switch 524 in each group of four sampling switches 500 to allow an image signal to be stored in sample and hold capacitor 526. AND gate 514 permits the N+x_COLEN signals to select the right pair of each group of four sampling capacitors 502 for readout.

When SELECT is high, AND gate 528 permits sampling into the rightmost sample and hold capacitor 502 (capacitor 530), while AND gate 520 permits the N+x_COLEN signals to select the left pair of each group of four sample and hold capacitors 502.

Referring now to FIG. 6, there is shown an exemplary timing diagram for non-concurrent sample and read operations for sampling and readout output circuits 210 shown in FIGS. 2 and 5. The SELECT line is held low during sampling and high during readout so only one set of sample and hold switches 500, a corresponding set of sample and hold capacitors 502, and a corresponding set of readout switches 504 are used. During sampling (the time period between times $t_0$ and $t_2$), the column address COLADDR is held at a given state X that does not address any active columns for readout. The SHR and SHS signals operate to sample and hold the pixel RESET signals (time $t_0$ to time $t_1$) followed by the pixel SIGNAL signals (time $t_1$ to time $t_2$). After sampling all of the RESET and SIGNAL signals in a row of pixels (time period after time $t_2$), COLADDR begins to provide sequential addresses in order to read out the sampled signals.

FIG. 7 depicts an exemplary timing diagram for concurrent sample and read operations for sampling and readout output circuits 210 shown in FIGS. 2 and 5. Assuming that a previous sampling operation has stored signals in the sampling and readout capacitors for readout, COLADDR begins immediately reading out the signals from the right pair of sampling and readout capacitors in each group of four sampling and readout capacitors 502 (see time $t_3$), while SHR (time $t_3$ to time $t_4$) and SHS (time $t_4$ to time $t_5$) sample into the left pair of sampling and readout capacitors in each group of four sampling and readout capacitors 502. The X in COLADDR means the addressing sequence has completed and the COLADDR is set to a value that does not address any active column for readout.

When the sampling and readout operations are complete at time $t_6$, the SELECT line switches the functions of the two sets of sampling and readout capacitors in each group of four sampling and readout capacitors 502. COLADDR then begins reading out the left pair of sampling and readout capacitors while SHR and SHS sample into the right pair of sampling and readout capacitors in each group of four sampling and readout capacitors 502. In the FIG. 7 embodiment, readout activity is occurring at the critical falling edges of SHR and SHS. This raises the potential for system noise that can be sampled into the sampling capacitors along with the desired pixel reset or signal.

Figure 8:
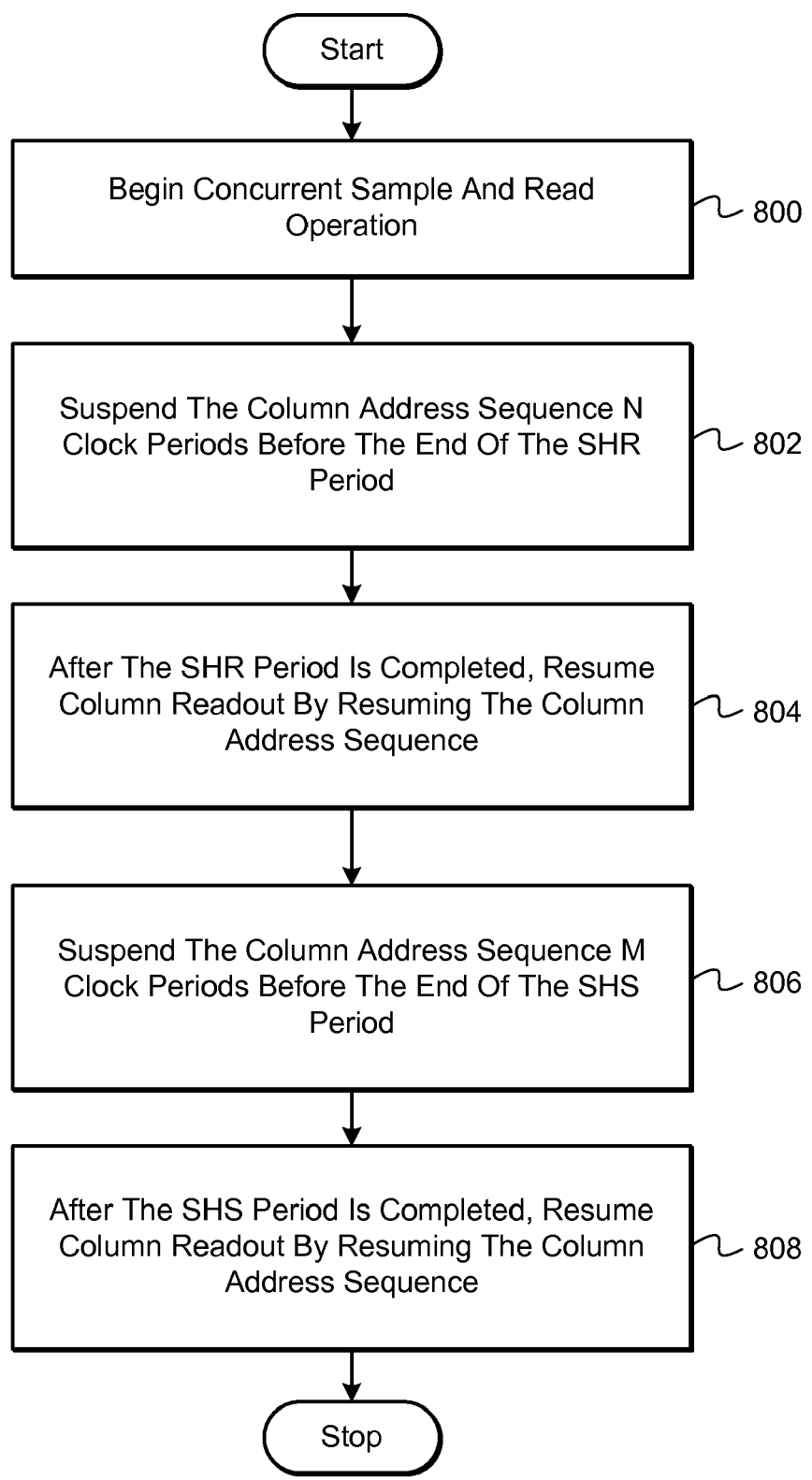
FIG. 8 is a flowchart of a method for suspending column readout in an embodiment in accordance with the invention.

Referring now to FIG. 8, there is shown a flowchart of a method for suspending column addressing in an embodiment in accordance with the invention. Initially, concurrent sample and read operations are initiated, as shown in block 800. The sampling of signals from a row of pixels along with column readout of a previously sampled signals both begin at essentially the same time, such that sampling and column readout are performed concurrently (e.g., time $t_3$ in FIG. 7).

Next, as shown in block 802, N clock periods before the end of the SHR period (SHR period is time $t_3$ to time $t_4$ in FIG. 7), the column addressing sequence supplied to column decoder 204 is suspended. The value of N is specified in a programmable control register, such as, for example, control register 214, or fixed by the design in an embodiment in accordance with the invention. For example, the value N is selected for the shortest pause possible. If N is too short, there may still be system noise captured by the sampling. If N is too long, the performance will be reduced because the completion of the addressing sequence is delayed.

The supply of the column addressing sequence to the column decoder resumes when the SHR period is completed at the falling edge of the SHR signal (block 804). The column address sequence resumes where it was suspended in block 802 in an embodiment in accordance with the invention.

Figure 9:
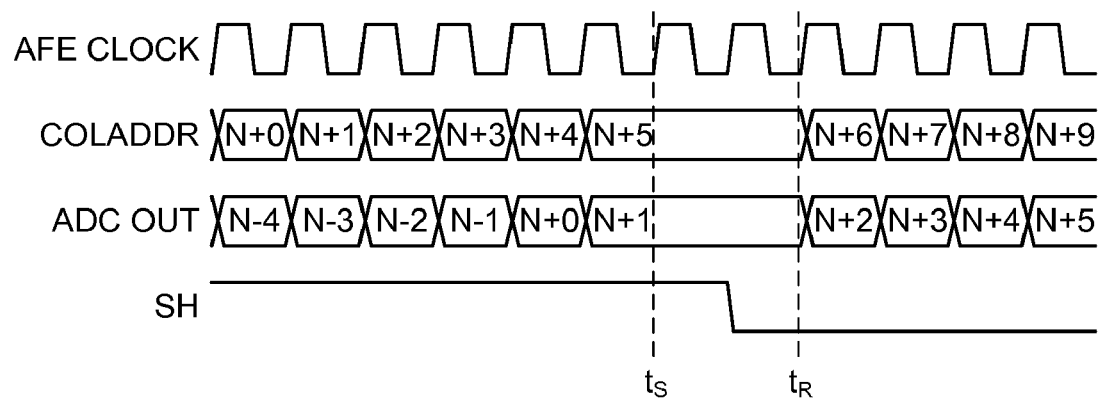
FIG. 9 depicts an exemplary timing diagram for the method shown in FIG. 8.

FIG. 9 is a timing diagram that shows graphically the operations described in blocks 802 and 804. The SH signal in FIG. 9 corresponds to either the SHR signal or the SHS signal in FIG. 7. FIG. 9 provides additional detail and shows an embodiment of the present invention around the falling edge of either SHR at time $t_4$ in FIG. 7 or SHS at time $t_5$ in FIG. 7. When considered in the context of blocks 802 and 804, the SH signal should be regarded as the SHR signal. As shown in FIG. 9, some time before the end of the SHR sampling period (at time $t_S$ in FIG. 9) COLADDR is suspended, as described in block 802. Shortly after the end of SHR (at time $t_R$ in FIG. 9) COLADDR resumes, as described in block 804.

Next, as shown in block 806, M clock periods before the end of the SHS period (SHS period is time $t_4$ to time $t_5$ in FIG. 7), the column addressing sequence supplied to the column decoder is suspended. The value of M is specified in a programmable control register, such as, for example, control register 214, or fixed by the design in an embodiment in accordance with the invention.

The supply of the column addressing sequence to the column decoder resumes when the SHS period is completed at the falling edge of the SHS signal (block 808). The column address sequence resumes where it was suspended in block 806 in an embodiment in accordance with the invention.

As with blocks 802 and 804, FIG. 9 shows graphically the operations described in blocks 806 and 808. When considered in the context of blocks 806 and 808, the SH signal should be regarded as the SHS signal. As shown in FIG. 9, some time before the end of the SHS sampling period (at time $t_S$ in FIG. 9) COLADDR is suspended, as described in block 806. Shortly after the end of SHS (at time $t_R$ in FIG. 9) COLADDR resumes, as described in block 808.

Suspension of the column address sequence can repeat until all of the signals have been sampled and readout of the pixel array. As is described in more detail in conjunction with FIGS. 10 and 11, the pixel data output from each output circuit can be stored while the column address sequence is suspended. Storing of the pixel data selectively delays the output of the pixel data to effect an uninterrupted output data flow of pixel data.

FIG. 9 illustrates an exemplary timing diagram for the method shown in FIG. 8. In this embodiment, the sequence of column addresses COLADDR to the column decoder (FIGS. 2 and 5) is suspended for one or more clock periods around the end of the sampling time, shown here by the sample and hold signal SH. This suspension of the sequence of column addresses COLADDR happens at the end of each sampling period in an embodiment in accordance with the invention. For example, the sequence of column addresses is suspended at the end of SHR and again at the end of SHS.

When the column address COLADDR changes during the column address sequence, each new column address propagates through the column read decoder 204 (FIG. 5), effectively deselecting one column output circuit and selecting a different column output circuit. The newly selected column output circuit causes the RESET and SIGNAL lines in the differential analog output bus 506 (FIG. 5) to change. This switching activity produces system noise which may be sampled by sampling processes occurring during this time. By suspending the sequence of column addresses to the column decoder around the end of the sampling time, system noise due to switching activity associated with changing column addresses is eliminated, thereby reducing system noise at this critical sampling time.

Figure 10:
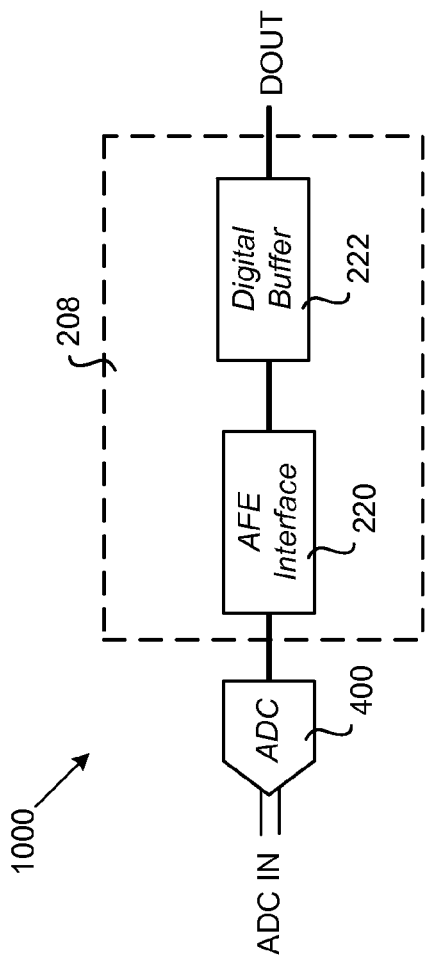
FIG. 10 depicts a block diagram of a circuit that is used to make the interrupted data stream from FIG. 9 continuous with the use of a digital buffer.
Figure 11:
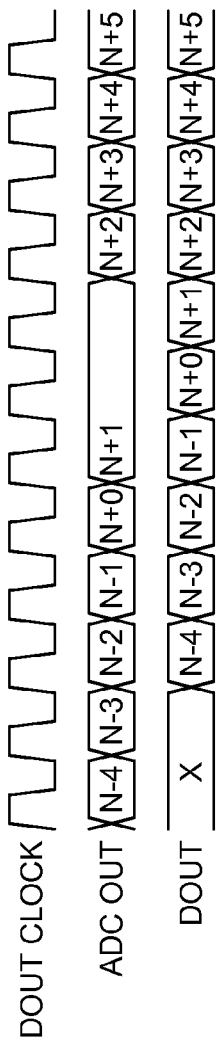
FIG. 11 depicts an exemplary timing diagram for the circuit shown in FIG. 10.

In one or more embodiments in accordance with the invention, the output of the image sensor may be received by an imaging system or processing system that cannot handle the interruptions in the flow of data caused by the suspensions of the AFE clock signal. FIG. 10 depicts a block diagram of a circuit that is used to make the interrupted data stream from FIG. 9 continuous with the use of a digital buffer. FIG. 11 illustrates an exemplary timing diagram for the circuit shown in FIG. 10.

The circuit 1000 receives the interrupted ADC output ADC OUT (see FIG. 9) and outputs the desired non-interrupted data flow DOUT (see FIGS. 10 and 11) from the image sensor. ADC OUT output from ADC 400 is received in the digital logic 208 (FIG. 2) by AFE interface 220. This data output stream will have one or more interruptions in it due to one or more suspensions of the column addressing sequence. The data captured by AFE interface 220 is stored in digital buffer 222 as it is received. The readout of each row of data from digital buffer 222 begins a number of clock periods after the first data is written into the buffer, where the number of clock periods is greater than or equal to the total number of clock periods that the column address sequence is suspended during each row of readout as shown in FIG. 11. In an embodiment in accordance with the invention, digital buffer 222 consists of a first-in-first-out (FIFO) memory with selectable depth, but those skilled in the art will recognize that other implementations are possible.

Although FIG. 11 shows recovering from a single interruption of the column addressing sequence, multiple interruptions could take place when sampling a row of pixels. Multiple interruptions could occur, for example, when separately sampling pixel reset and signal levels (using the SHR and SHS signals, for example). In the case of multiple interruptions, the start of output data from DOUT must be delayed sufficiently to anticipate the total combined times of all column addressing interruptions. Digital buffer 222 stores the interrupted ADC output ADC OUT during all of the interruptions in the same row.

The invention has been described in detail with particular reference to certain preferred embodiments thereof, but it will be understood that variations and modifications can be effected within the spirit and scope of the invention. For example, embodiments in accordance with the invention have been described herein with respect to concurrent sampling and readout of the reset signals and image signals. Other embodiments in accordance with the invention are not limited to these signals. Embodiments of the present invention can concurrently read out and sample any signal and any number of signals.

Additionally, the illustrated embodiments have been described with reference to specific components and circuits. Other embodiments in accordance with the invention are not limited to these particular components. For example, logic gates other than AND gates and different types of switches can be used in the embodiment shown in FIG. 5.

Even though specific embodiments of the invention have been described herein, it should be noted that the application is not limited to these embodiments. In particular, any features described with respect to one embodiment may also be used in other embodiments, where compatible. And the features of the different embodiments may be exchanged, where compatible.

PARTS LIST 100 image capture device
102 light
104 imaging stage
106 image sensor
108 processor
110 memory
112 display
114 input/output (I/O) elements
200 pixel
202 pixel array
204 column decoder
206 row decoder
208 digital logic
210 sampling and readout circuit
212 analog front end (AFE)
214 control register
216 timing generator
218 analog front end clock controller
220 analog front end interface
222 digital buffer
300 active area
302 column of photoactive pixels
304 row of photoactive pixels
306 row reference area
308 column reference area
400 analog to digital converter (ADC)
402 analog signal processor (ASP)
404 variable gain amplifier
406 variable gain amplifier
408 signal summing node
410 digital to analog converter (DAC)
500 sampling switches
502 sample and hold capacitors
504 readout switches
506 differential analog output bus
508 AND gate
510 sampling switch
512 sample and hold capacitor
514 AND gate
516 AND gate
518 sample and hold capacitor
520 AND gate
522 AND gate
524 sampling switch
526 sample and hold capacitor
528 AND gate
530 sample and hold capacitor
1000 non-interrupted data flow output circuit

What is claimed is:

1. A method for reading out an image from an image sensor including a two-dimensional array of pixels having a plurality of column outputs and an output circuit connected to each column output, wherein each output circuit is configured to operate concurrent sample and read operations, the method comprising:
    initiating concurrent sample and read operations in each output circuit;
    during a first sample operation, suspending a column address sequence, wherein suspending the column address sequence includes holding the column address sequence in a state such that the column address sequence does not address any of the plurality of column outputs for a read operation; and
    at or after the completion of the first sample operation, resuming the column address sequence.

2. The method as in claim 1, further comprising:
    during a second sample operation, suspending the column address sequence; and
    at or after the completion of the second sample operation, resuming the column address sequence.

3. The method as in claim 2, wherein the column address sequence is suspended during the first sample operation for a predetermined first number of clock periods.

4. The method as in claim 3, wherein the column address sequence is suspended during the second sample operation for a predetermined second number of clock periods.

5. The method as in claim 4, wherein the predetermined first and second numbers of clock periods are the same.

6. The method as in claim 4, wherein the predetermined first

7. The method as in claim 1, further comprising selectively storing at least a portion of pixel data output from the output circuits. and second numbers of clock periods are different.

* * * * *

UNITED STATES PATENT AND TRADEMARK OFFICE
CERTIFICATE OF CORRECTION

PATENT NO.        : 8,384,813 B2                        Page 1 of 1
APPLICATION NO.   : 12/972947
DATED             : February 26, 2013
INVENTOR(S)       : John T. Compton et al.

It is certified that error appears in the above-identified patent and that said Letters Patent is hereby corrected as shown below:

In the Claims,

Column 12, line 52 (claim 6), "first" should read --first and second numbers of clock periods are different.--

Column 12, line 55 (claim 7), please delete "and second numbers of clock periods are different."

Signed and Sealed this
Tenth Day of February, 2015

Michelle K. Lee
*Deputy Director of the United States Patent and Trademark Office*